Aug. 2, 1960     D. H. RAYBOULD     2,947,543
MANURE SPREADER FOR DUMP TRUCK Filed Nov. 2, 1956     4 Sheets-Sheet 1

Delmar H. Raybould
*INVENTOR.*

BY *Clarence A. O'Brien*
*and Harvey B. Jackson*
*Attorneys*

Aug. 2, 1960

D. H. RAYBOULD 2,947,543

MANURE SPREADER FOR DUMP TRUCK

Filed Nov. 2, 1956

Delmar H. Raybould
INVENTOR.

BY
Attorneys

Aug. 2, 1960 D. H. RAYBOULD 2,947,543
MANURE SPREADER FOR DUMP TRUCK
Filed Nov. 2, 1956 4 Sheets-Sheet 4

Delmar H. Raybould
INVENTOR.

BY *Clarence A. O'Brien*
*and Harvey B. Jackson*
Attorneys

United States Patent Office 2,947,543
Patented Aug. 2, 1960

2,947,543
MANURE SPREADER FOR DUMP TRUCK
Delmar H. Raybould, 273 E. Main, Rexburg, Idaho
Filed Nov. 2, 1956, Ser. No. 620,096
18 Claims. (Cl. 275—5)

This invention comprises a novel and useful manure spreader for dump trucks and more particularly pertains to a trailer attachment having an improved association with and an improved detachable connection with a dump truck whereby loose material carried by the dump truck may be distributed and spread by the operation of the trailer attached thereto.

The principal purpose of this invention is to provide a trailer attachment particularly adapted for detachable engagement with a dump truck whereby manure or loose material carried by the truck may during travel of the truck and trailer over the ground be discharged into the trailer and from thence may be spread or scattered over the ground in a greatly improved manner.

A further object of the invention is to provide a trailer attachment which may be attachably coupled to the rear end of a dump truck whereby to receive the lower end of a truck body when the same is tilted into dumping position whereby the contents of the truck may be discharged into the trailer and may be automatically scattered or spread by the mechanism of the trailer.

Yet another object of the invention is to provide a trailer attachment for dump trucks wherein the power for operating the scattering or unloading and spreading mechanism of the trailer may be detachably coupled to a power take-off carried by the truck.

Yet another important object of the invention is to provide a scattering spreader and unloader trailer attachment for dump trucks in which the power operating means and the coupling means by which the trailer is operatively associated with the dump truck may be quickly and easily engaged or disengaged to facilitate the attachment of or the removal of the trailer from the truck.

A still further important object of the invention is to provide a trailer attachment for a dump truck wherein provision is made for compensating for irregularities of the surfaces over which the trailer and truck are traveling in order to permit the maintaining of a coupling attachment of the trailer to the truck and an operative engagement of the truck power take-off with the scattering unloader mechanism of the trailer.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

It is a fundamental purpose of this invention to provide a scattering unloader such as a manure spreader in the form of a trailer which may be readily and detachably connected in an improved manner to a dump truck, whereby the spreader may form an adjunct of the truck and cooperate with the dump body thereof for discharging and spreading the material carried by the dump body; and whereby the trailer may be readily coupled to and through this coupling may be provided with power from the truck.

Figure 1:
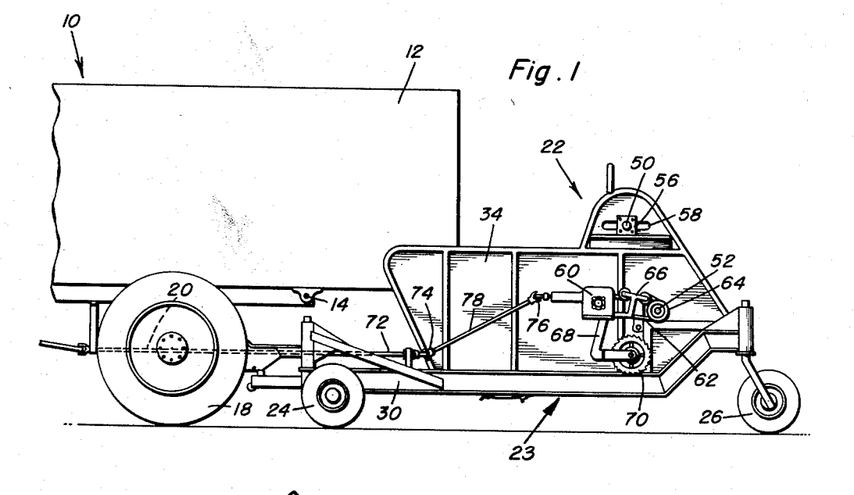
Figure 1 is a side elevational view of a manure spreader shown operatively connected to the rear portion of a dump truck, the body of the latter being shown in its lowered or usual transporting position.
Figure 2:
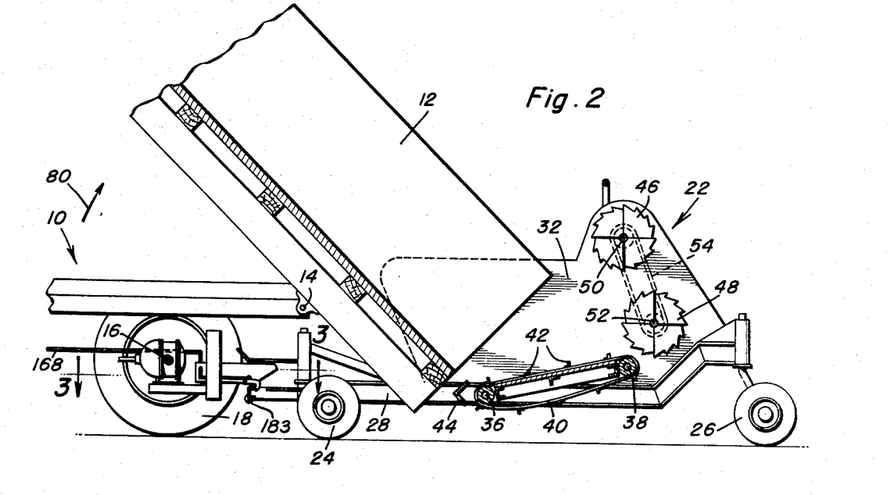
Figure 2 is a vertical central longitudinal sectional view through the truck and trailer elements of Figure 1 showing structural details of the same, the truck body being shown in its raised or dumping position.

Referring first to Figures 1 and 2 it will be seen that the numeral 10 designates generally a conventional form of dump truck having a dump body 12 mounted thereon for pivotal movement about the horizontal axis of the pivot members 14 whereby the truck body may be moved between a horizontal lowered load carrying position, shown in Figure 1, to a sharply inclined dumping position, shown in Figure 2, by suitable power operated means, not shown, and which in themselves form no part of the present invention.

The truck has a rear axle 16 having driving wheels 18 thereon and further provides a power take-off, not shown, but which includes a driving shaft 20 by means of which power may be imparted to the elements of the scattering unloader indicated generally by the numeral 22.

The latter element which is especially adapted for cooperation with the dump truck in a manner to be subsequently set forth, consists of a mobile or wheeled frame or chassis 23 supported by front caster wheels 24 and a rear caster wheel 26.

The frame 23 is carried by the wheels and employs a pair of spaced longitudinally extending beams or channel members 28 and 30 from which rise a pair of side walls 32 and 34 respectively. As will be apparent from Figure 2, these side walls are open at their end which is adjacent to the dump body 12 and are of sufficient width to receive the end of the dump body therebetween and to permit tilting of the dump body to its unloading position. For this purpose the frame or chassis of the trailer is provided with an open bottom. However, a pair of substantially horizontal and parallel elevator rollers 36 and 38 are suitably journaled between the horizontal members 28 and 30 of the chassis and between the two side walls 32 and 34 respectively, and entrained over these rollers is an endless inclined conveyor belt 40 having the usual flights 42 thereon. Adjacent to the lowermost roller 36 of the conveyor belt there is an angle iron or L-shaped cross member 44 which is fixedly secured between the two beams 28 and 30 in a position closely adjacent to the belt, whereby, as shown in Figure 2, material discharged from the rear end of the dump body 12 will be deflected onto the surface of the conveyor belt and lifted thereby upwardly and rearwardly with respect to the truck and trailer.

Adjacent to the upper end of the belt there are provided suitable material scattering and discharge or unloading means, the same consisting of a pair of elevationally spaced toothed rollers 46 and 48 journaled, as by axles 50 and 52, between the side walls 34 and 32. The discharge means are arranged in operative relation to the upper end of the conveyor belt whereby material carried upwardly on the belt will be passed through the discharge means and thrown by the same rearwardly of the trailer in a manner which is well understood in the art and which in itself forms no part of the present invention.

It will be observed, however, that the two axles 50 and 52 are operatively connected together, as by a belt or sprocket chain indicated in dotted lines at 54 in Figure 2, and in order to tighten the same the upper axle 50 is carried by a bearing member 56 which is slidably mounted in a longitudinally extending slot 58. By this means the driving connection between the two rollers may be adjusted as desired.

Operating mechanism is provided for imparting rotation to the conveyor belt 40 and to the rollers 48 and 46 for discharging and scattering the material dumped into the device. For this purpose there is provided, as shown in Figure 1, a gear housing 60 secured to a side wall, such as 34, and by means of which motion is imparted to a belt 62. The latter is entrained over a pulley 64 carried by the axle 52 thereby to impart rotation to the rollers 46 and 48. A belt tightener 66 of a conventional design is associated with the belt 62 for tightening the latter, and may in some instances constitute a clutch for controlling the operation of the scattering and spreading rollers. Also operatively driven from the gear casing 60 by means of a crank lever 68 and a suitable ratchet mechanism is the ratchet wheel 70 fixed to the end of the shaft 38. Thus, step-by-step motion is imparted to the elevator belt for feeding material upwardly into the spreading and discharging rollers.

The operating mechanism further includes a driving shaft 72 suitably journaled on the frame of the trailer and which is connected by universal joints 74 and 76 and an intermediate shaft 78 with the above-mentioned gear casing 60 for actuating the same. A detachable connection is provided between the driving shaft 72 and the previously mentioned shaft 20 connected with the power take-off of the truck.

As so far described, it will now be apparent that when the trailer is coupled to the rear end of a truck it will be towed thereby in such a manner that a rear end of the dump body will be received between the side walls of the trailer. Further, the conveyor belt 40 and the scattering or unloading rollers 46 and 48 will be all driven by the power take-off means of the truck during the attachment of the trailer to the truck. When it is desired to discharge material from the truck, the dump body is tilted, as shown by the arrow 80 in Figure 2, to its tilted position, at which time the lower end of the dump body is moved downwardly between the side walls and between the spaced frame members 28 and 30 of the trailer. Consequently, the material carried by the dump body will be discharged upon the lower end of the elevator belt 40, the cross member 44 serving as a guard or apron for the same to assist the material falling upon the belt. Consequently, as the truck travels forwardly, in the position shown in Figure 2, the material will be discharged from the truck body from the rear end of the trailer by means of the belt 40 and the discharge rollers 46 and 48. It will thus be seen that the dump body of the truck constitutes in effect a greatly enlarged replaceable hopper for the trailer, whereby the latter is adapted to handle the entire capacity of a dump truck and yet may be of relatively small dimensions. This arrangement facilitates the use of a series of dump trucks successively for discharging their contents into a substantially continuously employed scattering unloader for spreading such contents upon the ground.

A detachable connection is provided between the trailer and the truck which serves the dual functions of connecting the trailer to the truck for movement thereby, and also serves to supply power to the elements of the trailer from the power take-off of the truck. This detachable connecting means will be described in detail, a special reference being made to Figures 3–11 for a description thereof.

Figure 3:
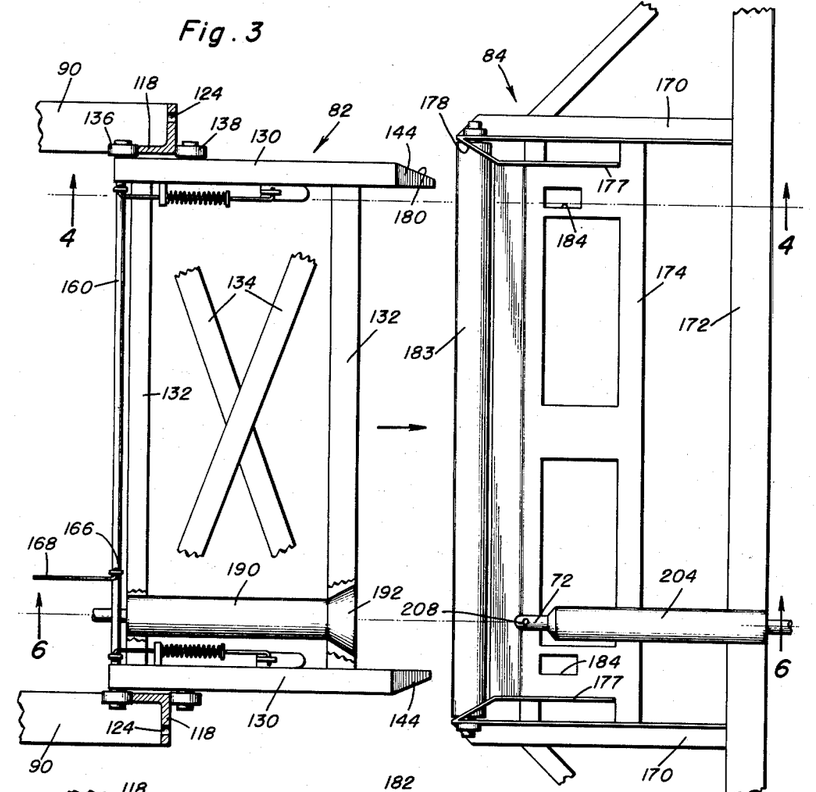
Figure 3 is a top plan view of the detachable connection between the truck and trailer, with parts removed for clearness of illustration, but showing that portion of the connection which is mounted upon the dump truck together with the associated portion of the attachment which is carried by the trailer, the two sections being shown in their disconnected position, being taken substantially upon the plane indicated by section line 3—3 of Figure 2.
Figure 4:
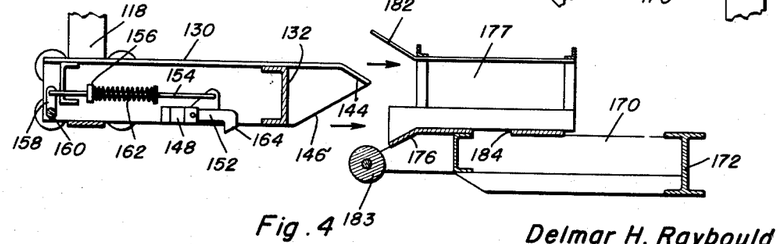
Figure 4 is a vertical longitudinal sectional view taken substantially upon the plane indicated by section line 4—4 of Figure 3 and showing in vertical section associated portions of the two sections of the coupling assembly.
Figure 5:
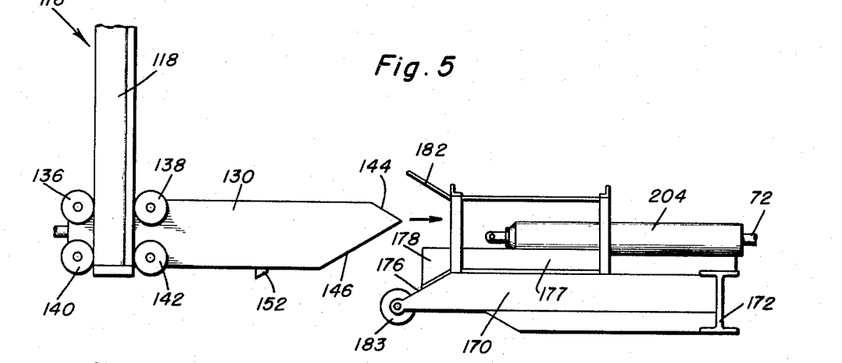
Figure 5 is a side elevational view of the two sections of Figure 3.

This detachable coupling and connecting means is shown in disassembled relation in horizontal section in Figure 3, in side elevation in Figure 5, and in vertical longitudinal section in Figure 4. The detachable driving connection between the power take-off of the truck and the operating mechanism for the elements of the trailer is shown in vertical section in disassembled relation in Figure 6 and in a similar section but assembled relation in Figure 7.

The detachable coupling and connecting assembly consists of a drawbar member indicated generally by the numeral 82 and carried by the truck, together with a tongue assembly indicated generally by the numeral 84 and carried by the trailer.

Figure 8:
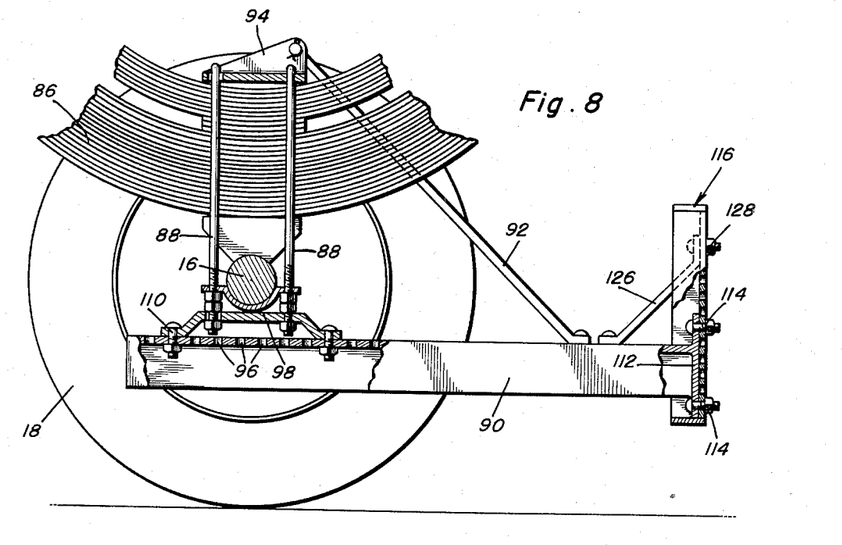
Figure 8 is a detail view in vertical longitudinal section showing the rear axle of the dump truck and the manner in which the coupling assembly is secured thereto.

Considering first the drawbar assembly 82, reference is now made especially to Figures 8 and 3. In Figure 8 it will be seen that the rear axle 16 of the rear wheels 18 of the truck has the usual supporting springs 86 operatively secured thereto. Rigidly clamped to the springs and to the axle as by clamping bolts 88 are a pair of horizontally and rearwardly extending L-shaped beams or frame members 90 held rigidly in place as by suitable brace rods 92 connected to a bracket 94 mounted on the truck and to the frame members 90. At their forward ends, the frame members 90 are provided with a plurality of longitudinally spaced apertures 96.

Figure 10:
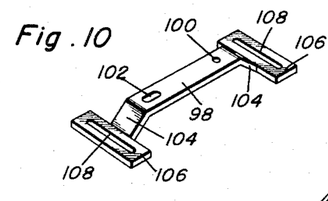
Figures 10 and 11 are perspective views of bracket elements forming a part of the coupling assembly.
Figure 11:
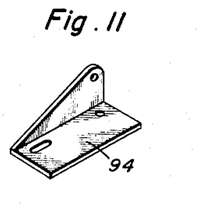

As will be seen from Figures 8 and 10, a pair of brackets are provided whereby the members 90 may be adjustably secured to the axle assembly of the dump truck. These brackets consist of web portions 98 apertured as at 100 and 102 for reception of the clamping bolts 88, the aperture 102 being elongated as shown to facilitate attachment of the brackets to the fastening bolts. The web portions have angulated, down turned extremities 104 terminating in transversely disposed flanges 106 which are slotted as at 108. Fastening bolts 110 serve to clamp the flanges 106 to selected apertures 96 of the members 90 thereby permitting both longitudinal and transverse adjustment of the members 90 with respect to the axle assembly of the truck.

Figure 9:
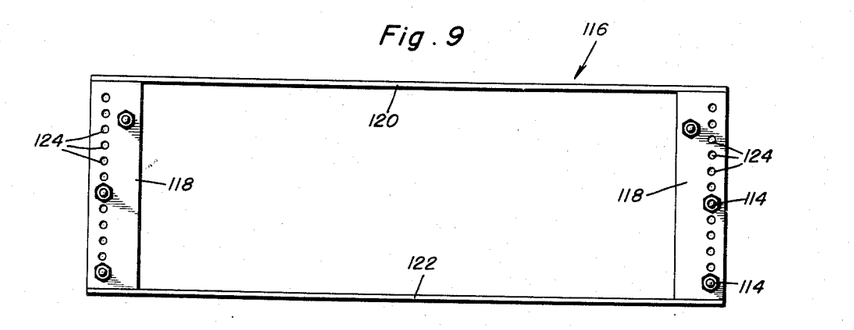
Figure 9 is a front elevational view taken from the right end of Figure 8 and showing a portion of the same.

At their rearward ends the members 90 are provided with vertical flanges 112 comprising mounting brackets receiving the fastening bolts 114. By means of the latter a vertical and transversely extending frame member, indicated generally by the numeral 116 and shown in Figure 9, is mounted. This latter member comprises a pair of vertical angle iron members 118 which are rigidly connected at their upper and lower extremities, as by the cross members or stops 120 and 122. As will be apparent from Figures 8 and 9, the angle iron members 118 are provided with a plurality of vertically spaced apertures 124 for reception of the fastening bolts 114, whereby the member 116 may be vertically adjusted relative to the frame members 90. Further brace members 126 are secured at their lower ends to the frame members 90, and are adjustably secured to the vertically extending standards or posts 118 by means of fastening bolts 126. These vertically extending standards or posts 118, constitute a means whereby compensation may be made for relative vertical movement between the trailer and the tractor during travel of these units over irregular terrain.

The drawbar assembly 82 comprises a carriage mounted upon the vertical standards 118 for floating elevational movement thereon. This carriage assembly includes a rigid frame comprising a pair of longitudinally extending beams 130 rigidly connected together as by cross members 132 and suitable brace members 134. Each of the members 130 has journaled thereon, as will be more readily apparent from Figure 5, upper and lower sets of guide rollers 136 and 138, and 140 and 142, respectively. These rollers embrace the standards 118 and thus mount the carriage thereon for vertical travel. At their rearward ends, each of the members 130 is provided with rearwardly inclined and rearwardly convergent cam surfaces 144 and 146 respectively which serve, as set forth hereinafter, as guide means to facilitate the engagement of the drawbar assembly 82 with the tongue assembly 84.

As will be best apparent from Figures 3 and 4, each of the carriage members 130 is provided upon its inside surface with a bracket 148 having a latch hook 152 pivoted thereto. A rod 154 is pivoted to the latch hook and extends slidably through a guide bracket 156 on the member 130, and is connected to an arm 158 on a crankshaft 160. A compression spring 162 is operatively connected to the rod 154 and the bracket 156 yieldingly to urge the latch into its latching position. As will be observed, the latch hook is provided with an inclined camming surface 164 for a purpose to be subsequently apparent.

The shaft 160 in turn is provided with a crank arm 166 and an actuating rod 168 is secured thereto and extended to any convenient place for actuation of the same.

The tongue assembly 84 consists of a forwardly projecting rigidly mounted framework secured to the chassis of the trailer. For this purpose, a pair of arm 170 are rigidly secured to and extend forwardly from a front cross member 172 of the chassis frame of the trailer, a suitable transverse reinforcing and bracing cross member 174 being rigidly attached to these arms. At their forward ends each arm is provided with a downwardly inclined camming surface 176 which is adapted to be engaged by the previously mentioned lower camming surface 146 of the members 130 of the drawbar assembly.

There is also provided a vertically extending guide bracket 178 upon the upper portion of each of the arms 170 which at its forward end is provided with a forwardly and outwardly extended camming surface 177. As shown, the camming surfaces are forwardly divergent and are adapted to cooperate with the rearwardly convergent outside camming surfaces 180 of the arms 130. Still further, there are provided, preferably integral with the guide flanges 178, upwardly inclined forwardly projecting guide flanges 182 which are adapted to overlie and cooperate with the upper camming surfaces 144 of the members 130. A guide roller 183 is positioned at the extreme forward portion of the arms 170 and extends transversely between the same to engage the surfaces 146 of the members 130 and assist in lifting the same upwardly into cooperative engagement with the members 170. It thus will be seen that the arms 130 with their camming surfaces 144, 146 and 180, mounted for floating elevational movement by the engagement of the rollers 136 and 138 with the members 118, constitute an elevationally self-aligning male coupling member. Similarly, it will be observed that the arms 170 with their camming surfaces 176 and 177, and the guide flanges 178 and 182 constitute a female coupling member which is horizontally self-aligning with the male member inasmuch as the trailer is mounted for horizontal movement on its swivel wheels 24 and 26.

Suitable latch receiving slots, recesses or apertures 184 are provided in the above mentioned transverse brace member 174 and are adapted to receive the latches 152 when the drawbar and tongue sections are moved into engagement with each other, in the manner shown in Figure 2.

As so far described, it will now be apparent that by means of the vertical travel of the carriage of the drawbar assembly upon its supporting and guiding standards 118, the cooperative camming surfaces 146 and 144 of the drawbar assembly will engage the guide roller 183 and/or the guide flanges 177 vertically to position and align the cooperating portions of the drawbar and the tongue assemblies. As these members move towards each other into nesting interconnection, a further camming action takes place between the surfaces 180 of the draw bar assembly and the guide surfaces 178 of the tongue assembly transversely or laterally to align the drawbar and tongue assemblies. As the members move toward each other, as indicated by the arrows in Figures 3 and 4, the bottom surfaces of the arms 130 slide upon the top surface of the cross member 174 until the latches 152 are caused by the springs 162 to engage in the latch recesses or keepers 184 thereby locking the two sections of the coupling together with said male and female coupling members in latched engagement.

The coupling may be detached or released by merely actuating the rod 168 which in turn causes the latches to disengage and thereby permit the drawbar and tongue assemblies to be pulled apart.

Figure 6:
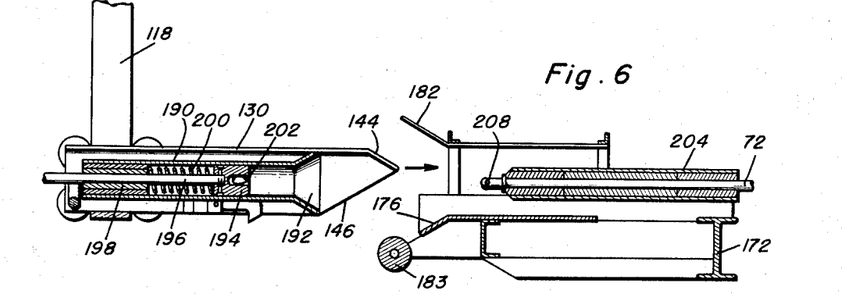
Figure 6 is a vertical longitudinal sectional view taken substantially upon a plane indicated by section line 6—6 of Figure 3 and showing in particular the two detachable sections of the driving means for transmitting power from the power take-off of the truck to the scattering and unloading mechanism of the trailer attachment.
Figure 7:
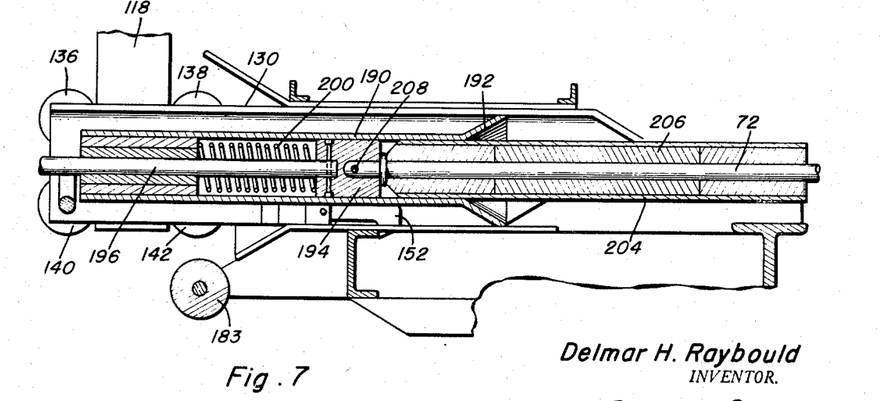
Figure 7 is an enlarged view of Figure 6 but showing the two sections of the coupling assembly in their assembled and engaged position.

As will be best apparent from Figures 6 and 7, taken in conjunction with Figure 3, there is also provided a detachable connecting means whereby the operating mechanism of the trailer, including its driving shaft 72 may be detachably coupled with the power take-off shaft 20 of the truck. For this purpose there is rigidly secured in any desired manner to the cross members 132 of the carriage portion of the drawbar assembly 82 a cylinder or tube 190 open at both of its ends and having its rearward end outwardly flaring, as at 192, to provide a funnel or conical guide surface. Slidable within the tube is a socket 194 forming a female coupling, and which is secured to a driving shaft 196 for rotation therewith, this shaft being in turn journaled in suitable bushings or bearings 198 disposed in the tube. The shaft 196 in turn is connected in any desired manner to the power take-off shaft 20, it being understood that suitable universal joints, not shown, will be provided to permit change of angularity of the shafts as desired and floating elevational movement of the shaft 198 and associated structure.

A compression spring 200 is disposed within the tube and abuts against the socket 194 and the bushing 198 in order yieldingly to urge the socket 194 rearwardly of the tube but yieldingly to permit forward movement of the same, as required. The socket is provided with a longitudinally extending slotted recess 202.

A cylindrical housing 204 is fixedly secured to the frame of the tongue assembly 84 and in a position adapted to align with the tube 190. As will be seen from Figure 7, the member 204 has a sliding fit within the tube 190, being guided for entry thereinto by the flaring conical member 192. Rotatably journaled in the member 204, as by suitable bushings or bearings 206, is the previously mentioned driving shaft 72 having at its forward extremity a transversely projecting pin 208 adapted to penetrate and have locking engagement with the socket 194 in the driving recess 202 thereof. The arrangement is such that when the tongue and drawbar assemblies are coupled together, as previously set forth, the forward end of the shaft 72 and of the housing 204 will also be engaged as shown in Figure 7, with the recess 202 and the cylinder 190, respectively. Thus, a driving connection between the power take-off of the truck and the operating mechanism of the trailer is established simultaneously with the engagement or disengagement of the coupling of the same. It will thus be seen that the two sections or components forming the coupling assembly also carry corresponding components of a driving connection, and the connecting or disconnecting of the driving engagement between the power take-off of the truck and the operating mechanism of the trailer are automatically effected simultaneously with the engagement or disengagement of the coupling between the truck and trailer. It will also be observed that both the coupling engagement and the connection between the power take-off and the operating mechanism of the trailer have provision whereby they are not adversely effected by vertical displacement between the truck and trailer as occurs in traversal of irregular terrain and the like.

It will be understood that in some instances it may be preferred to omit the detachable driving connection and secure merely the advantages of the improved coupling means between a tractor and trailer vehicle. Further, the principles of the invention as set forth hereinbefore are not only particularly advantageous for use with a dump truck body and a scattering spreader and unloader, but may be utilized in other environments.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a drawing vehicle mounted for longitudinal earth traversing movement, and a mobile caster wheel supported trailing vehicle adapted for alignment with the drawing vehicle by adjustment in transverse direction with respect thereto, an automatic coupling apparatus comprising a drawbar assembly rearwardly extended from the drawing vehicle, means borne by the drawing vehicle mounting the drawbar assembly on the drawing vehicle for free floating elevational movement in fixed position with respect to the transverse dimension of said vehicle, a tongue assembly rigidly mounted on the trailing vehicle in forwardly disposed position telescopically engageable with the drawbar assembly for reciprocal rectilinear movement relative thereto longitudinally of the drawing vehicle between coupled position interconnecting the vehicles in fixed alignment while accommodating relative elevational movement of the vehicles and disengaged relation, and one of said assemblies having oppositely transversely and oppositely elevationally disposed camming surfaces divergently extended toward and engageable with the opposite assembly, releasable means mounted on one of the assemblies and engageable with the other automatically actuated by movement of the assemblies to coupled position to retain said assemblies in such position.

2. In combination with a drawing vehicle mounted for longitudinal earth traversing movement, and a trailing vehicle mounted for longitudinal earth traversing movement and adjustable transverse positioning, an automatic coupling apparatus for interconnecting the vehicles in rigid alignment in a substantially vertical plane of reference while accommodating relative elevational movement of the trailing vehicle in said plane while constrained to parallel positions comprising a drawbar assembly including a pair of substantially horizontal arms rigid therewith, means mounting the drawbar assembly on the drawing vehicle for free floating elevational movement with the arms substantially horizontally rearwardly extended from the drawing vehicle in fixed position transversely thereof and constrained to parallelism in their various positions, a tongue assembly rigidly mounted on the trailing vehicle including means adapted telescopically to receive the arms of the drawbar assembly in releasably fixed alignment with the tongue assembly and in fixed relation to the trailing vehicle, and automatically actuated releasable latch means mounted on one of the assemblies and engageable with the other releasably to retain said arms and means in said fixed relation.

3. In combination with a drawing vehicle mounted for longitudinal earth traversing movement, and a trailing vehicle mounted for longitudinal earth traversing movement and adjustable transverse positioning, an automatic coupling apparatus for interconnecting the vehicles in rigid alignment comprising a drawbar assembly including a pair of substantially horizontal arms rigid with said assembly, said arms having upwardly, downwardly, and oppositely laterally disposed camming surfaces; means mounted on the drawing vehicle mounting the drawbar assembly on said drawing vehicle for floating elevational movement with the arms substantially horizontally rearwardly extended from the drawing vehicle in fixed position transversely thereof and continuous parallelism during said elevational movement; a tongue assembly rigidly mounted on the trailing vehicle including means adapted telescopically to receive the arms of the drawbar assembly in releasably fixed relation to the trailing vehicle, said means having upwardly and downwardly and oppositely disposed camming surfaces adapted to engage the respective opposite camming surfaces of the arms to align said means and the arms when the same are approximately aligned and moved into engagement; and automatically actuated releasable latch means operably associated with the arms and the arm receiving means to retain said arms and means in said fixed relation.

4. A coupling apparatus for connecting a caster wheel supported trailing vehicle to a drawing vehicle mounted for longitudinal earth traversing movement comprising a female coupling member, a male coupling member slidably fitted to the female coupling member, said members having upwardly, downwardly, and oppositely laterally disposed camming surfaces adapted for engagement with opposite corresponding surfaces of each other to align said members when approximately aligned and moved into engagement, means mounted on the drawing vehicle mounting one of the coupling members in rearwardly disposed position on the drawing vehicle for free floating elevational movement in continuous parallelism and constant position transversely of the drawing vehicle, means mounted on the trailing vehicle mounting the other coupling member rigidly on the trailing vehicle in forwardly disposed position for coactive engagement with said coupling member on the drawing vehicle, a substantially horizontal roller rotatably mounted on the female coupling member downwardly adjacent to the upwardly disposed camming surface thereof for rolling engagement with the downwardly disposed camming surface of the male coupling member, the means mounting the coupling member on the drawing vehicle including a stop limiting downward movement of its coupling member to a position with the roller of the female coupling member disposed for rolling engagement with the downwardly disposed coupling surface of the male coupling member, and automatically actuated latch means releasably interconnecting the coupling members in coactive engagement.

5. In combination with a mobile drawing vehicle mounted for longitudinal earth traversing movement and having a power take-off, and a trailing vehicle having a mechanism requiring a power drive, an automatic coupling and drive connecting apparatus comprising a drawbar assembly rearwardly extended from the drawing vehicle, means mounted on the drawing vehicle mounting the drawbar assembly on the drawing vehicle for free floating elevational movement in continuous parallelism and fixed relation transversely of said vehicle, a tongue assembly rigidly mounted on the trailing vehicle in forwardly disposed position telescopically engageable with the drawbar assembly for reciprocal rectilinear movement relative thereto longitudinally of the drawing vehicle between coupled position in fixed relation and disengaged position, said assemblies in coupled position interconnecting the vehicles in alignment in fixed transverse relation while accommodating relative elevational movement of the vehicles, and cooperative shaft and socket elements mounted respectively on said vehicles for engagement and disengagement simultaneously with the coupling and uncoupling of the drawbar and tongue assemblies, one of said elements having driven connection to the power take-off and the other thereof driving connection to the mechanism requiring a power drive and said elements being mounted integrally with the assemblies of their respective vehicles.

6. In combination with a drawing vehicle mounted for longitudinal earth traversing movement and having a power take-off, and a mobile trailing vehicle transversely shiftable for alignment with the drawing vehicle having a mechanism requiring a power drive, an automatic coupling and drive connecting apparatus comprising a drawbar assembly rearwardly extended from the drawing vehicle, means mounted on the drawing vehicle mounting the drawbar assembly on the drawing vehicle for free floating elevational movement in continuous parallelism and substantially fixed relation transversely of said vehicle, a tongue assembly rigidly mounted on the trailing vehicle in forwardly disposed position telescopically engageable with the drawbar assembly for reciprocal rectilinear movement relative thereto longitudinally of the drawing vehicle between coupled position and disengaged position, said assemblies in coupled position interconnecting the vehicles in alignment in substantially fixed transverse relation while accommodating relative elevational movement of the vehicles, a rotatable shaft element, a rotatable socket element adapted to receive the shaft element in releasable driving engagement therewith, means mounting one of said elements in fixed rearwardly disposed position on the coupling member of the drawing vehicle for unitary elevational movement therewith and in driven connection to the power take-off of said vehicle, means mounting the other of said elements on the trailing vehicle in forwardly disposed position in fixed relation to the coupling member thereof in position adapted for driving engagement with the element of the drawing vehicle when the coupling members are in coactive engagement, and releasable automatically actuated latch means releasably interconnecting the coupling members in telescopic engagement.

7. A coupling apparatus for connecting a trailing vehicle having a material spreading mechanism to a drawing vehicle having a power take-off comprising a female coupling member, a male coupling member slidably fitted to the female coupling member, said members having coacting camming surfaces adapted to align said members when approximately aligned and moved into engagement, means mounted on the drawing vehicle mounting one of the coupling members in rearwardly disposed position on the drawing vehicle for free floating elevational movement, means mounted on the trailing vehicle mounting the other coupling member on the trailing vehicle in forwardly disposed position for coactive engagement with said coupling member on the drawing vehicle, cooperative shaft and socket elements mounted respectively on said vehicles for engagement and disengagement simultaneously with the engagement and disengagement of the coupling members, one of said elements having driven connection to the power take-off and the other having driving connection to the material spreading mechanism and the element of the drawing vehicle being mounted for unitary elevational movement with the coupling member thereof, and releasable latch means operably associated with the coupling members to retain said members in coactive engagement and the elements in driving engagement.

8. A coupling apparatus for connecting a trailing vehicle having a material spreading mechanism to a drawing vehicle having a power take-off comprising a female coupling member, a male coupling member slidably fitted to the female coupling member, said members having coacting camming surfaces adapted to align said members when approximately aligned and moved into engagement, means mounting one of the coupling members in rearwardly disposed position on the drawing vehicle for free floating elevational movement in continuous parallelism in substantially fixed transverse relation thereon, means rigidly mounting the other coupling member on the trailing vehicle in forwardly disposed position for coactive engagement with said coupling member on the drawing vehicle, a shaft element, a socket element, adapted to receive the shaft element in releasable driving engagement therewith, means mounting one of said elements in fixed rearwardly disposed position on the coupling member of the drawing vehicle in driven connection to the power take-off thereof, means mounting the other of said elements in fixed forwardly disposed position on the coupling member of the trailing vehicle adapted for mated driving engagement with the element of the drawing vehicle and in driving connection with the spreading mechanism of the trailing vehicle, and releasable latch means operably associated with the coupling members to retain said members in coactive engagement and the elements in driving engagement.

9. A coupling apparatus for connecting a mobile swivel wheel supported trailing vehicle and having a material spreading mechanism, in fixed alignment with a drawing vehicle, having a dump body adapted to discharge load material out the rear thereof and a power take-off, comprising a female coupling member, a male coupling member fitted to the female coupling member for reciprocal rectilinear slidable movement between coupled and disengaged positions, said members having coacting camming surfaces adapted elevationally and horizontally to align the members when approximately aligned and moved into engagement, means mounting one of the coupling members in rearwardly disposed position on the drawing vehicle for free floating elevational movement in continuous parallelism and substantially fixed position transversely of its vehicle, means rigidly mounting the other coupling member on the trailing vehicle in forwardly disposed position for coactive engagement with said coupling member on the drawing vehicle whereby such engagement results in interconnection of the vehicles in alignment in fixed transverse relation and for free relative elevational movement, a shaft element, a socket element adapted to receive the shaft element in releasable driving engagement therewith, means rotatably mounting one of said elements in fixed rearwardly disposed position on the coupling member of the drawing vehicle in driven connection to the power take-off thereof, means rotatably mounting the other of said elements in fixed forwardly disposed position on the trailing vehicle in driving connection to the material spreading mechanism, said elements being positioned with respect to the coupling members for releasable driving engagement upon coactive engagement of the coupling members, and releasable latch means operably associated with the coupling members to retain said members in coactive engagement and the elements in driving engagement.

10. In combination with a drawing vehicle mounted for longitudinal earth traversing movement and having a power take-off, and a trailing vehicle mounted for longitudinal earth traversing movement and adjustable transverse movement for alignment with the drawing vehicle and having driven means requiring a power supply; an automatic coupling apparatus for interconnecting the vehicles in alignment in fixed transverse relation comprising a drawbar assembly including a pair of substantially horizontal arms, said arms having upwardly, downwardly, and oppositely laterally disposed camming surfaces; means mounting the drawbar assembly on the drawing vehicle for free floating elevational movement in continuous parallelism with the arms substantially horizontally rearwardly extended from the drawing vehicle in fixed position with respect to the transverse dimension thereof; a tongue assembly rigidly mounted on the trailing vehicle including means adapted telescopically to receive the arms of the drawbar assembly in releasably fixed relation to the trailing vehicle, said means having upwardly and downwardly and oppositely laterally disposed camming surfaces adapted to engage the respective opposite camming surfaces of the arms to align said means and the arms when the same are approximately aligned and moved into engagement; a rotatable shaft element; a rotatable socket element adapted to receive the shaft element in releasable, axially aligned, driving engagement therewith; means mounting one of said elements in fixed rearwardly disposed position on the coupling member of the drawing vehicle and in driven connection with the power take-off of said vehicle; means mounting the other of said elements on the trailing vehicle in driving connection to the driven means thereof in forwardly disposed position in fixed relation to the coupling member thereof and in axial alignment with the element on the drawing vehicle for driven engagement wherewith when the coupling members are in coactive engagement; and automatically actuated releasable latch means operably interconnecting the arms and the arm receiving means to retain said arms and means in said fixed telescopic relation.

11. In combination with a truck having a rearwardly disposed dump body and a power take-off mounted for longitudinal earth traversing movement on ground engaging support wheels, and a trailer having a material spreading mechanism requiring a power drive mounted for longitudinal earth traversing movement and transverse adjustable positioning for alignment with the truck, automatic apparatus for simultaneously coupling the trailer to the truck for earth traversing movement and connecting the power take-off to the spreading mechanism comprising a drawbar assembly mounted on the truck for free floating elevational movement in continuous parallelism and substantially fixed position transversely of the truck and rearwardly extended therefrom, said assembly having upwardly, downwardly, and oppositely laterally disposed camming surfaces; a tongue assembly rigidly mounted on the trailer and forwardly disposed therefrom, said tongue assembly having upwardly, downwardly, and oppositely laterally disposed camming surfaces adapted to engage the opposite corresponding surfaces of the drawbar assembly whereby when said assemblies are moved into coactive engagement the drawbar assembly floats to elevational alignment with the tongue assembly and the tongue assembly is urged into position with the trailer aligned with the truck in a position to receive material discharged from the dump body; a rotatable shaft element; a rotatable socket element adapted to receive he shaft element in releasable driving interconnection therewith; means rotatably mounting one of said elements in fixed rearwardly disposed position on the drawbar assembly in driven connection with the power take-off of the truck; means rotatably mounting the other of said elements in fixed forwardly disposed position on the trailer, said elements being positioned with respect to the coupling members for releasable driving interconnection thereof upon coactive engagement with the coupling members, and latch means releasably interconnecting the coupling members to retain said members in coactive engagement and the elements in driving engagement for unitary earth traversing movement of the truck and trailer.

12. The apparatus of claim 11 in which a substantially horizontal roller is rotatably mounted on the tongue assembly in substantial alignment with the upwardly disposed camming surface thereof for rolling support of the downwardly disposed camming surface of the drawbar assembly.

13. The apparatus of claim 10 in which the mounting means for one of said elements includes a compression spring mounting its respective element for resilient movement axially of said aligned elements.

14. A spreader comprising a truck having a source of power and a tilting dump body providing a rearward end which is lowered by tilting the dump body to discharge the contents thereof; a trailer including a mobile frame and material discharging and spreading means mounted thereon; automatic coupling means connecting the trailer to the truck below the dump body and forwardly of the rearward end thereof, said coupling means including a drawbar assembly rearwardly extended from the truck, means mounting the drawbar assembly on the truck for free floating elevational movement in substantially fixed transverse relation on the truck, and a tongue assembly rigidly mounted on the trailer in forwardly disposed position telescopically engageable with the drawbar assembly for reciprocal rectilinear movement relative thereto longitudinally of the truck between coupled and uncoupled positions incident to relative longitudinal movement of the truck and trailer, said assemblies in coupled position interconnecting the truck and trailer in alignment in fixed transverse relation while accommodating relative elevational movement thereof; a drive mechanism mounted on the trailer and having driving connection to the spreading means; and automatic connecting means operatively attaching said drive mechanism to the source of power on the truck, the connecting means including cooperative shaft and socket elements mounted respectively on the coupling assemblies for engagement and disengagement simultaneously with the coupling and uncoupling of said assemblies, said trailer having side walls positioned to receive therebetween the rear end of the dump body when the latter is tilted to dumping position.

15. A coupling apparatus for connecting a drawing vehicle mounted for longitudinal earth traversing movement to a caster wheel supported trailing vehicle adapted automatically to align said vehicles by relative adjustable transverse positioning during such connecting and to constrain said vehicles to such alignment while permitting relative elevational movement thereof during earth traversing movement comprising a male coupling member having a pair of substantially parallel arms horizontally extended longitudinally of the drawing vehicle, a female coupling member adapted telescopically to receive the arms of the male coupling member having oppositely elevationally disposed camming surfaces engageable with the arms of the male member to force said members and their respective vehicles into alignment in a common vertical plane longitudinally of said vehicles when the male member is telescopically received in the female member, means borne by one of the vehicles mounting one of the members on said vehicle for free floating elevational movement with respect to said vehicle in said common vertical plane, means borne by the other vehicle mounting the other of said members rigidly on said other vehicle, and releasable automatic latch means mounted on one of said members and engageable with the other thereof to latch the members in telescopic association actuated by movement of the arms into telescopically received position in the female member.

16. In combination with a drawing vehicle mounted for longitudinal earth traversing movement, a mobile trailing vehicle transversely shiftable relative to the drawing vehicle for alignment purposes, a pair of horizontally spaced substantially parallel arms horizontally extended from one of the vehicles longitudinally of the drawing vehicle, means borne by the vehicle from which said arms are extended mounting the arms in fixed position with respect to the transverse dimension of said vehicle and for elevational movement on said vehicle, said mounting means constraining the arms during such elevational movement to parallelism in their various elevational positions, a female coupling member adapted telescopically to receive the arms in fixed relation therein, means rigidly mounting the female coupling member on the vehicle opposite to that on which the arms are mounted and disposed toward the arms for receipt thereof, the female coupling member having oppositely horizontally disposed camming surfaces divergent toward the arms and engageable with the arms to guide them into the female coupling member so as to shift the trailing vehicle transversely of the drawing vehicle when the arms are telescopically received in the female coupling member, the means mounting the arms having a stop engageable therewith to limit downward elevational movement thereof to positions engageable with the camming surfaces of the female member, and releasable automatic latch means interconnecting the arms and the female coupling member in telescopic association.

17. In combination with a material transporting and dumping drawing vehicle mounted for longitudinal earth traversing movement and a material receiving and spreading trailing vehicle mounted for longitudinal earth traversing movement and adjustable transverse positioning, power means on said drawing vehicle and extending therefrom, power receiving means on said trailing vehicle, cooperating vehicle coupling means disposed on each of said vehicles, separate cooperating coupling means connected to said power means and to said power receiving means, both of said cooperating coupling means comprising engaging male and female members mounted respectively on said vehicles and on said power means, and means for automatically guiding said members into engagement when said drawing vehicle is moved toward and in approximate alignment with the trailing vehicle whereby said vehicles and said power communicating means are simultaneously engaged upon such movement, the male and female members being so positioned on their respective vehicles that when said members are engaged the trailing vehicle is positioned in relation to the drawing vehicle to receive material dumped therefrom.

18. In combination with a dump truck mounted for longitudinal earth traversing movement and a manure spreader mounted for longitudinal earth traversing movement and adjustable transverse positioning, power means on said dump truck and extending therefrom, power receiving means on said manure spreader, cooperative coupling means disposed on the dump truck and on the manure spreader, separate cooperating coupling means connected to said power means and to said power receiving means, both of said cooperating coupling means comprising engaging male and female members mounted respectively on the dump truck and manure spreader and on said power means, and means for automatically guiding said members into engagement when said dump truck is moved toward and in approximate alignment with the manure spreader whereby said truck and spreader and said power means are simultaneously coupled upon such movement.

References Cited in the file of this patent

UNITED STATES PATENTS

| | | |
|---|---|---|
| 827,431 | Evensen | July 31, 1906 |
| 1,542,093 | Raymond | June 16, 1925 |
| 1,979,945 | Kranick | Nov. 6, 1934 |
| 1,986,231 | Thomas | Jan. 1, 1935 |
| 2,252,691 | Arndt | Aug. 19, 1941 |
| 2,342,942 | Johnston | Feb. 29, 1944 |
| 2,363,071 | Le Tourneau | Nov. 21, 1944 |
| 2,391,971 | Hollos | Jan. 1, 1946 |
| 2,514,089 | Punsky | July 4, 1950 |
| 2,717,783 | Flink | Sept. 13, 1955 |
| 2,777,700 | Valantin | Jan. 15, 1957 |
| 2,779,260 | Orelind et al. | Jan. 29, 1957 |
| 2,784,656 | Sheppard | Mar. 12, 1957 |